United States Patent Office 3,133,115
Patented May 12, 1964

---

3,133,115
1,2-DI(FLUOROHALOALKYL)-1,2-DICYANO-
ETHYLENES AND THEIR PREPARATION
Stephen Proskow, Wilmington, Del., assignor to E. I. du
Pont de Nemours and Company, Wilmington, Del., a
corporation of Delaware
No Drawing. Filed Nov. 25, 1960, Ser. No. 71,390
6 Claims. (Cl. 260—465.7)

This invention relates to new fluorinated organic compounds containing nitrogen. More particularly, it relates to, and has as its principal objects, the provision of a new class of fluorohaloalkyl-substituted cyanoethylenes and to a method for their preparation.

Di(fluorohaloalkyl) - substituted 1,2 - dicyanoethylenes are unknown in the literature. The usual methods of preparing substituted 1,2-dicyanoethylenes, which employ the corresponding substituted maleic or fumaric acids, esters or amides as the starting materials, are not applicable in the case of the di(fluorohaloalkyl)-substituted analogs because the requisite maleic and fumaric acids, esters and amides are unavailable. Hence, a method of making these unknown 1,2-dicyanoethylenes is of importance, not only as a means of obtaining the dicyano compounds themselves, but also as a potential source (through hydrolysis) of the heretofore unavailable di(fluorohaloalkyl)-substituted maleic and fumaric acids and their derivatives.

It has now been discovered that the previously unknown 1,2-di(fluorohaloalkyl)-1,2-dicyanoethylenes can be prepared by pyrolysis of chlorosulfites of fluoroaldehyde cyanohydrins. This new class of fluorinated cyanoethylenes and the method of making them are illustrated by the following equation:

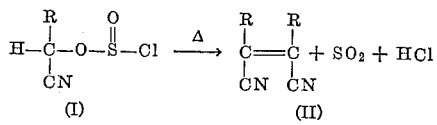

in which Formula II represents the 1,2-di(fluorohaloalkyl)-1,2-dicyanoethylenes and R represents a "fluorohaloalkyl" group of the class consisting of polyfluoroperhaloalkyl, i.e., perhaloalkyls containing at least two fluorine atoms (including perfluoroalkyl), and ω-hydroperfluoroalkyl of up to 18 carbon atoms. Especially preferred, because of the greater accessibility of the fluoroaldehyde cyanohydrins necessary for their preparation, are the thus designated members in which the R groups each contain up to 8 carbon atoms.

It should be recognized that tetra-substituted ethylenes, as represented by the above 1,2-di(fluorohaloalkyl)-1,2-dicyanoethylenes, may exist in isomeric cis and trans forms, and it is intended that both forms be included within the scope of Formula II.

The pyrolysis of the above-described fluoroaldehyde cyanohydrin chlorosulfites (I) is carried out at a temperature in the range of 200°–800° C., preferably between about 400° and 600° C. The reaction is conveniently accomplished under vapor-phase conditions at atmospheric pressure. However, the pressure is not critical and may be below or above atmospheric pressure. Likewise, the presence or absence of moisture is not critical in the process, but it is advisable to maintain substantially anhydrous conditions to avoid loss of the chlorosulfite by adventitious hydrolysis. A diluent is not necessary but may be used if so desired. In the pyrolysis process, the product can be conveniently isolated by flushing a slow stream of an inert carrier gas such as nitrogen through the reaction vessel and into a series of cold traps maintained at a temperature well below the boiling point of the product. The product can generally be purified by ordinary fractional distillation.

In the preparation of 1,2-di(fluorohaloalkyl)-1,2-dicyanoethylenes by the pyrolysis of fluoroaldehyde cyanohydrin chlorosulfites (I) at atmospheric pressure, it is convenient to introduce the chlorosulfite into the vapors of sulfur boiling under reflux, the reaction temperature thus being maintained at 444–445° C. In this version of the process the sulfur is merely a temperature modulator and is essentially inert; and therefore, the relative amounts of sulfur and chlorosulfite that are employed are not critical.

The material of which the pyrolysis apparatus is constructed is not critical. However, it is advantageous to use apparatus that is resistant to attack by any of the components of the reaction mixture, i.e., the fluoroaldehyde cyanohydrin chlorosulfite, the 1,2-di(fluorohaloalkyl)-1,2-dicyanoethylene, sulfur dioxide, or hydrogen chloride. Materials that are suitable include glass, copper, nickel, Monel, and a nickel-iron-molybdenum alloy.

The fluoroaldehyde cyanohydrin chlorosulfites that are used in making 1,2-di(fluorohaloalkyl)-1,2-dicyanoethylenes constitute a new class of compounds which can be readily prepared from thionyl chloride and the cyanohydrins of fluoroaldehydes. (Fluoroaldehyde cyanohydrins can be obtained by the reaction of fluoroaldehydes and hydrogen cyanide as described in U.S. 2,681,370.) The reaction involved in the preparation of the chlorosulfite is illustrated by the equation:

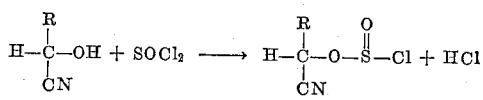

in which the R group of the cyanohydrin and of the cyanohydrin chlorosulfite is fluorohaloalkyl as defined above. In this process for making the chlorosulfite, the reactants are first mixed at a low temperature and then are heated at reflux at about atmospheric pressure. The product is isolated directly from the reaction mixture by distillation under reduced pressure.

The invention is illustrated in greater detail in the following examples.

EXAMPLE I

A. *1-Cyano-2,2,2-Trifluoroethyl Chlorosulfite*

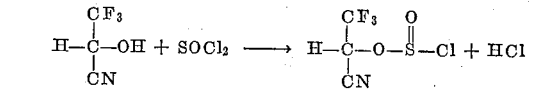

A mixture of 1.0 g. of ammonium chloride and 72 ml. (1.0 g. mole) of thionyl chloride was heated at reflux for 15 minutes. The mixture was cooled to 0–10° C., 127 g. (1.0 g. mole) of trifluoroacetaldehyde cyanohydrin (B.P. 80–85° C./60 mm., $n_D^{26.8}$ 1.3311, prepared by reaction of HCN with trifluoroacetaldehyde) was added, and the new mixture was refluxed for 10 hours at atmospheric pressure.

The cooled mixture was fractionated at reduced pressure by means of an efficient distillation column. After removal of excess thionyl chloride at ca. 250 mm. pressure, the pressure was reduced to 10 mm. and a pale yellow liquid distilling at 40–42° C. was collected; weight 129 g.

The liquid boiling at 40–42° C./10 mm. was identified as 1-cyano-2,2,2-trifluoroethyl chlorosulfite by elemental, infrared and n-m-r analysis.

*Analysis.*—Calc'd for $C_3HClF_3NO_2S$:

|  | C | H | Cl | F | N | S |
|---|---|---|---|---|---|---|
| Calc'd | 17.36 | 0.49 | 17.08 | 27.46 | 6.75 | 15.41 |
| Found | 18.39 | 0.81 | 16.88 | 27.62 | 6.79 | 15.08 |

The fluorine nuclear magnetic resonance, which consisted of two peaks in the ratio of ca. 2:3, each peak being split into a doublet, further established that the two racemic modifications of the product were present.

B. *1,2-Di(Trifluoromethyl)-1,2-Dicyanoethylene*

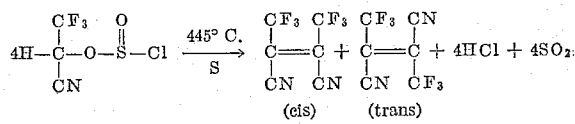

The apparatus employed for this reaction was a 300-ml. flask constructed with two vertical tubes about 30 cm. long and 2.5 cm. in diameter. One tube was equipped with a dropping funnel and nitrogen inlet. The other tube, the outlet tube, was attached in series to two traps by means of connecting tubes. A drying tube connected to the exit side of the second trap completed the assembly.

The flask was charged with about 200 g. of sulfur, and a slow stream of nitrogen was flushed through the system while the flask was heated to 444°–445° C. so that sulfur vapors were caused to reflux well up into the vertical outlet tube of the flask. The traps were then cooled with solid carbon dioxide-acetone and the nitrogen flow-rate was adjusted to ca. 100 ml./mm. While maintaining these conditions, 45.5 g. (0.22 g. mole) of 1-cyano-2,2,2-trifluoroethyl chlorosulfite was added dropwise from the funnel over a period of one hour. The volatile products were collected in the cooled traps, except for hydrogen chloride gas which escaped through the drying tube at the end of the system.

The trap contents were allowed to warm slowly to room temperature to remove the sulfur dioxide, and the residual liquid was evaporated at 1 mm. Hg pressure into a clean trap cooled to −80° C. A near-colorless solid that liquefied on warming to room temperature was obtained. This product was fractionally distilled at atmospheric pressure to give 14.5 g. of 1,2-di(trifluoromethyl)-1,2-dicyanoethylene as a colorless liquid, B.P. 100–104° C.

*Analysis.*—Calc'd for $C_6F_6N_2$:

|  | C | F | N |
|---|---|---|---|
| Calc'd | 33.66 | 53.25 | 13.09 |
| Found | 33.91 | 53.43 | 12.81 |

The product was a mixture consisting of approximately equal amounts of the cis and trans stereoisomers of 1,2-di(trifluoromethyl) - 1,2 - dicyanoethylene which became partially crystalline on standing at room temperature. The structures of the components of the mixture were confirmed by infrared spectrographic analysis that indicated the presence of C≡N (4.45 microns), conjugated —C=C— (6.17 microns) and C—F (8 microns region), and by two single fluorine nuclear magnetic resonance peaks at −976 c.p.s. (cis isomer) and −793 c.p.s. (trans isomer) relative to the fluorine resonance of trifluoroacetic acid.

Separation of the cis and trans isomers was effected analytically by vapor-phase chromatography at 53° C. with a column packing of 20% silicone fluid on 40–60 mesh calcined diatomaceous earth.

The cis isomer was converted to the trans isomer by treatment with such reagents as triethylamine, tetraethyl-ammonium fluoride and sodium fluoride. This conversion was essentially quantitative.

In the manner of the foregoing examples, a large number of 1,2-di(fluorohaloalkyl)-1,2-dicyanoethylenes can be obtained by pyrolysis of the corresponding fluoroaldehyde cyanohydrin chlorosulfites. In the following table are listed representative 1,2-di(fluorohaloalkyl)-1,2-dicyanoethylenes and the fluoroaldehyde cyanohydrin chlorosulfites from which they are obtained:

TABLE

| Fluoroaldehyde Cyanohydrin Chlorosulfite | 1,2-Di(fluorohaloalkyl)-1,2-dicyanoethylene |
|---|---|
| 1-Cyano-1-(perfluoroethyl) methyl chlorosulfite. | 1,2-Di(perfluoroethyl)-1,2-dicyanoethylene. |
| 1-Cyano-1-(perfluoropentyl)methyl chlorosulfite. | 1,2-Di(perfluoropentyl)-1,2-dicyanoethylene. |
| 1-Cyano-1-(perfluorodecyl)methyl chlorosulfite. | 1,2-Di(perfluorodecyl)-1,2-dicyanoethylene. |
| 1-Cyano-1-(perfluorotridecyl) methyl chlorosulfite. | 1,2-Di(perfluorotridecyl)-1,2-dicyanoethylene. |
| 1-Cyano-1-(perfluoroisobutyl) methyl chlorosulfite. | 1,2-Di(perfluoroisobutyl)-1,2-dicyanoethylene. |
| 1-Cyano-1-(ω-hydroperfluoropropl) methyl chlorosulfite. | 1,2-Di(ω-hydroperfluoropropyl)-1,2-dicyanoethylene. |
| 1-Cyano-1-(ω-hydroperfluorodecyl) methyl chlorosulfite. | 1,2-Di(ω-hydroperfluorodecyl)-1,2-dicyanoethylene. |
| 1-Cyano-1-(ω-hydroperfluorooctadecyl)methyl chlorosulfite. | 1,2-Di(ω-hydroperfluorooctadecyl)-1,2-dicyanoethylene. |
| 1-Cyano-1-(ω-chloroperfluorobutyl) methyl chlorosulfite. | 1,2-Di(ω-chloroperfluorobutyl)-1,2-dicyanoethylene. |
| 1-Cyano-1-(ω-chloroperfluorooctyl)methyl chlorosulfite. | 1,2-Di(ω-chloroperfluorooctyl)-1,2-dicyanoethylene. |
| 1-Cynao-1-(ω-chloroperfluorododecyl)methyl chlorosulfite. | 1,2-Di(ω-chloroperfluorododecyl)-1,2-dicyanoethylene. |
| 1-Cyano-1-(bromodifluoromethyl) methyl chlorosulfite. | 1,2-Di(bromodifluoromethyl)-1,2-dicyanoethylene. |
| 1-Cyano-1-(β-iodotetrafluoroethyl) methyl chlorosulfite. | 1,2-Di(β-iodotetrafluoroethyl)-1,2-dicyanoethylene. |

The 1,2-di(perfluoroalkyl)-1,2-dicyanoethylenes of this invention can be used in the analytical detection and estimation of aromatic compounds through the formation of characteristic colored π-complexes. This use is illustrated by the following list of aromatic compounds and the colors of the π-complexes which they form with the trans 1,2-di(trifluoromethyl)-1,2-dicyanoethylene of Example I–B.

| Aromatic Compound | Color of π-Complex |
|---|---|
| Benzene | Pale yellow. |
| Hexamethylbenzene | Orange-red. |
| Anthracene | Purple. |
| p-Dimethoxybenzene | Red. |
| Dimethylaniline | Blue. |
| p,p'-bis(dimethylamino)diphenyl | Blue-green. |
| Pyridine | Yellow. |

The 1,2-di(fluorohaloalkyl)-1,2-dicyanoethylenes as a class are useful as chemically reactive intermediates which can be converted to useful derivatives. For example, well known reactions of the cyano group may be employed: e.g., hydrolysis to produce 1,2-di(fluorohaloalkyl)-substituted maleic and fumaric acids, or alcoholysis to yield the corresponding maleic and fumaric esters. These derivatives are bifunctional, and hence are useful as intermediates in the preparation of condensation polymers, e.g., the 1,2-di(fluorohaloalkyl) maleic acids as a class may be used to prepare useful resins and plastics by reactions with glycols to form polyesters or with diamines to form polyamides according to the process of U.S. 2,174,619.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process of preparing 1,2-di(fluorohaloalkyl)-

1,2-dicyanoethylenes which comprises heating a chlorosulfite of the formula

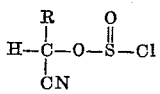

where R contains up to 18 carbons and is a member of the class consisting of polyfluoroperhaloalkyl and ω-hydroperfluoroalkyl, to a temperature of 200° to 800° C. under substantially anhydrous conditions.

2. The process of claim 1 wherein the temperature is between about 400° and 600° C.

3. The process of claim 1 wherein the chlorosulfite is introduced into the vapors of sulfur boiling under reflux.

4. The process of claim 1 wherein the chlorosulfite is 1-cyano-2,2,2-trifluoroethyl chlorosulfite.

5. 1,2 - di(fluorohaloalkyl) - 1,2 - dicyanoethylenes having the formula:

where R contains up to 18 carbons and is a member of the class consisting of polyfluoroperhaloalkyl and ω-hydroperfluoroalkyl.

6. 1,2-di(trifluoromethyl)-1,2-dicyanoethylene.

References Cited in the file of this patent

UNITED STATES PATENTS 2,782,218    Drysdale _____ Feb. 19, 1957

OTHER REFERENCES

Felton et al.: C.A., vol. 49, 1955, page 1378h.